(12) United States Patent
Brouwer et al.

(10) Patent No.: US 7,471,193 B2
(45) Date of Patent: Dec. 30, 2008

(54) WING MIRROR UNIT AND ACTUATOR

(75) Inventors: Stefan F. Brouwer, The Hague (NL); Steven J. Vanhoof, Wassenaar (NL)

(73) Assignee: MCi (Mirror Controls International) Netherlands B.V., Montfoort (NL)

(*) Notice: Subject to any disclaimer, the term of this patent is extended or adjusted under 35 U.S.C. 154(b) by 193 days.

(21) Appl. No.: 10/551,059

(22) PCT Filed: Mar. 30, 2004

(86) PCT No.: PCT/NL2004/000214

§ 371 (c)(1),
(2), (4) Date: Feb. 23, 2006

(87) PCT Pub. No.: WO2004/087463

PCT Pub. Date: Oct. 14, 2004

(65) Prior Publication Data

US 2006/0238318 A1    Oct. 26, 2006

(30) Foreign Application Priority Data

Apr. 1, 2003 (NL) .................................. 1023076

(51) Int. Cl.
*B60Q 1/00* (2006.01)

(52) U.S. Cl. ................. 340/436; 340/903; 359/365; 342/70; 396/427

(58) Field of Classification Search ............ 340/436, 340/903; 359/365; 342/70; 396/429
See application file for complete search history.

(56) References Cited

U.S. PATENT DOCUMENTS

| 3,659,929 | A | * | 5/1972 | Yuzawa ................... 359/865 |
| 5,929,786 | A | * | 7/1999 | Schofield et al. ........... 340/903 |
| 2002/0017985 | A1 | * | 2/2002 | Schofield et al. ........... 340/436 |
| 2002/0176712 | A1 | * | 11/2002 | Brown ...................... 396/427 |
| 2004/0012516 | A1 | * | 1/2004 | Schiffmann et al. ......... 342/70 |

* cited by examiner

*Primary Examiner*—Jeff Hofsass
*Assistant Examiner*—Ojiako Nwugo
(74) *Attorney, Agent, or Firm*—Dykema Gossett PLLC

(57) ABSTRACT

A detection system for detection of an object in a blind spot of a wing mirror unit. The detection system includes an observation unit for generating observation data, a data processing unit for processing the observation data, and an indication unit for displaying a warning signal. Internal data communication connections of the system may be disposed in a wing mirror unit so that the detection system is autonomous.

26 Claims, 2 Drawing Sheets

WING MIRROR UNIT AND ACTUATOR

The invention relates to a wing mirror unit, in particular for a motor vehicle, comprising a detection system for detecting an object in a blind spot of the wing mirror unit, which detection system is provided with an observation unit for generating observation data, a data processing unit for processing the observation data, and an indication unit for displaying a warning signal.

Such a wing mirror unit is, for instance, known from GB 2 311 265, which describes a detection system for warning a driver of a motor vehicle when an object is detected in the blind spot of the wing mirror unit.

From the driver's seat of a motor vehicle, the driver, also when using the wing mirror unit, cannot observe the complete visual field diagonally behind him, unless the driver turns his face diagonally backward. In connection with traffic safety, it is not desirable during participation in traffic to turn the head regularly so far that the driver can look diagonally behind. The segment of the visual field diagonally behind the driver that is therefore not observed is also called a blind spot.

GB 2 311 265 describes a detection system for detecting objects in the blind spot, inter alia with the aid of infrared or radar sensors on the wing mirror unit. These sensors are connected with a data processing unit for interpreting the measuring data. The data processing unit is further connected with, inter alia, an optical element in a rear view mirror, so that the driver can observe a warning signal on detection of an object in the blind spot.

A drawback of the detection system described in GB 2 311 265 is, however, that expensive data communication connections are required to use the detection system in motor vehicles. When the data processing unit is placed in the wing mirror unit, the data processing unit communicates with the rear view mirror via a relatively complex and expensive so-called master-master bus connection, while different electronic systems connected to the bus connection can independently initiate a signal stream. If the data processing unit is connected centrally in a bus system, then apart from wiring for standard electric functions in the wing mirror unit, an extra data connection is required for the data connection between the sensors in the wing mirror unit and the data processing unit. Moreover, when designing the motor vehicle, and in particular the bus system, the system requirements of the detection system must be considered beforehand. The detection system is hard to fit into an already designed and dimensioned communication concept.

The invention contemplates a wing mirror unit of the type mentioned in the opening paragraph, in which, with retention of the advantages, the above drawbacks are avoided. In particular, the invention contemplates a wing mirror unit, in which the use of complex and expensive communication connections is avoided. To this end, internal data communication connections of the detection system are disposed in the wing mirror unit according to the invention, so that the detection system is autonomous.

By designing the detection system to be autonomous, that is to say by causing electronic components of the detection system, namely the observation unit, the data processing unit, and the indication unit, to communicate via internal data communication connections in the wing mirror unit, without making use of data communication connections, such as a central bus system, if present, in the motor vehicle, it is ensured that the detection system can, in principle, function independently of other electronic systems of the motor vehicle. Consequently, the detection system does not transfer data to the motor vehicle. In other words, the detection system generates data that are only available inside the wing mirror unit. This has the result that communication between the detection system of the wing mirror unit and the motor vehicle need not take place via a data connection arranged for a relatively high data rate, or via a master-master bus system, also called a two-way multiplex system. Furthermore, the autonomous detection system is more flexible with respect to already designed bus systems or motor vehicles, since fewer specific requirements are imposed on the interface of a bus system, if present, in the motor vehicle. Moreover, the autonomous detection system is applicable in different types of motor vehicles, or even in different types of types of wing mirror units. Through scaling up thus become possible, potential cost price reductions can be realized.

By connecting the autonomous detection system as slave unit to a master-slave bus system disposed in the motor vehicle, it is ensured that transfer of data from the motor vehicle to the detection system is possible, for instance to bring the detection system into a state of increased vigilance. Since in a master-slave bus system there is one central component, the master, which controls the communication of the bus, the system is inherently less expensive than a master-master bus system.

Preferably, the data processing unit is disposed on an actuator for adjusting a mirror supporting plate provided with a mirror glass, which actuator is mounted on a supporting frame of the wing mirror unit. By disposing the data processing unit on the actuator, the majority of the electronic elements of the wing mirror unit is localized centrally, so that electric connections, for instance the feed or the wiring to an interface with a master-slave bus, remain limited and are easy to realize. A saving of cost of components and assembly thereof is thus realized. In the vicinity of the actuator, there may be many electric facilities of the wing mirror unit. The actuator itself may, for instance, comprise two electromotors and two position sensors for the position of a mirror glass. Furthermore, the mirror glass may be provided with a mirror heating element or an electrochromium dimmer. Furthermore, in the wing mirror unit, there are often lights and direction indicators. Because the data processing unit is sometimes connected to a bus system, and because the actuator mostly comprises more than one electronic component, it is advantageous to dispose the data processing unit on the actuator near a slave unit connectible to the bus system, or to integrate it therewith.

A second advantage of the autonomous design of the detection system is that the observation unit, the data processing unit, and the indication unit are thus arranged relatively close to each other. This adds very much to the quality of the signals during data transfer. Especially if the observation unit is provided with radar technology, it is of importance that the distance between the observation unit and the data processing unit is as small as possible.

The invention also relates to an actuator on which the data processing unit is disposed.

Further advantageous embodiments of the invention are represented in the subclaims.

The invention will be explained in more detail on the basis of exemplary embodiments shown in the drawing. In the drawing.

The figures are only schematic representations of preferred embodiments of the invention. In the figures, similar or corresponding parts are indicated by the same reference numerals.

Figure 1:
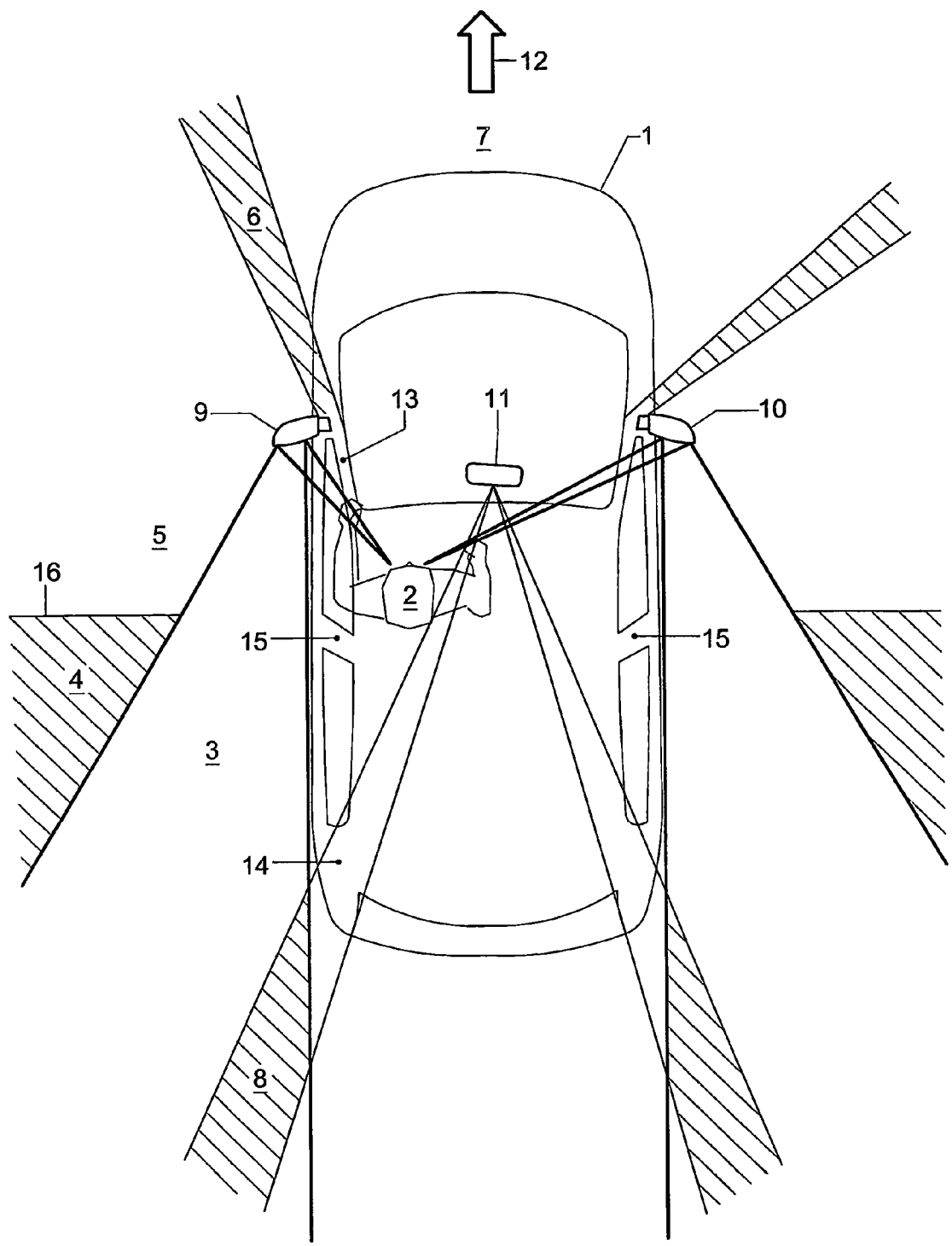
FIG. 1 shows a schematic top view of a motor vehicle.

In FIG. 1 is shown a motor vehicle 1, which is driven by a driver 2 in a traffic direction 12. The motor vehicle 1 is provided with a wing mirror unit on the left side, the left mirror 9, and on the right side, the right mirror 10. Further disposed in the cabin of the motor vehicle 1 is a rear view mirror 11. The driver 2 has a free view on the front side 7 of the vehicle 1. Also the area 5 diagonally before the driver 2 is directly visible. By looking into the left mirror 9, the driver 2 also sees an area 3 diagonally behind him. There is, however, a segment 4 of the total visual field between the area 5 diagonally before and the area 3 behind the driver 2 that the driver 2 cannot observe directly or via the left mirror 9 without looking diagonally behind him. This segment 4, which is bounded by an imaginary line 16 through the turned head of the driver and the left middle stile 15, the so-called B-stile, and an edge of the visual field visible to the driver 2 through the left mirror 9, is also called a blind spot 4. The blind spot 4 is schematically represented in FIG. 1 by a hatched area. Overlooking objects in the blind spot is an important cause of accidents during changing lanes, and in swerving and overtaking maneuvers. The wing mirror unit described in this application is provided with means for detecting objects, such as, for instance, another passing motor vehicle.

Through the presence of a front stile 13, the A-stile, the driver cannot get a good view of another segment 6 of the total visual field between the front side 7 of the vehicle 1 and the area 5 diagonally before the driver 2. This area forms a second blind spot 6. A third blind spot 8 is located diagonally behind the rear stile 14, the C-stile. Via the rear view mirror 11, this third blind spot 8 is not visible very well. On the right side of the motor vehicle 1, comparable blind spots can be perceived. The above-described blind spots are schematically represented in FIG. 1 by hatched areas. The figure is schematically represented in order to map areas with blind spots.

Figure 2:
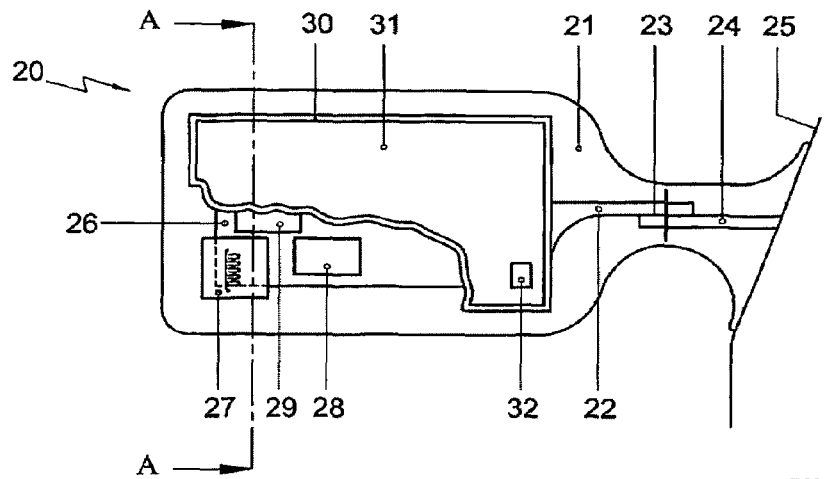
FIG. 2 shows a schematic longitudinal section of a wing mirror unit according to the invention.
Figure 3:
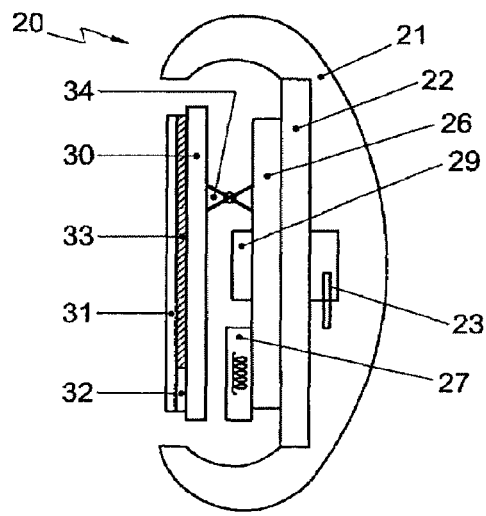
FIG. 3 shows a schematic cross-section of the wing mirror unit of FIG. 2 along the line A-A.

In FIGS. 2 and 3 is shown a wing mirror unit 20 according to the invention. Mounted on the outer wall 25 of the body of the motor vehicle 1 is a base plate 24, on which a supporting frame 22 is mounted by means of a rotatable structure 23. The supporting frame 22 is provided with a mirror housing 21, which substantially forms the exterior of the wing mirror unit 20. Further disposed on the supporting frame 22 is an actuator 26. The actuator 26 comprises a hinged structure 34 and a motorized drive, not shown, which are both coupled to a mirror supporting plate 30, on which a mirror glass 31 is mounted. In FIG. 2 are represented, in partly cut-away view, the mirror supporting plate 30 and the mirror glass 31. The mirror glass 31 is fixed on the mirror supporting plate 30, for instance with a glue layer 33. However, also other fixing means may be used, such as, for instance, a screw or click connection. The actuator 26, which often has two motor-driven degrees of freedom, enables the driver 2 of the motor vehicle 1, by means of an electric operation from the driver's seat, to position the mirror supporting plate 30 and hence the mirror glass 31 about a substantially vertical and a substantially horizontal axis of rotation in a desired orientation. Further disposed on the actuator 26 are an observation unit 27, a data processing unit 29, and other electronic components, such as, for instance, a control unit 28 for controlling a heating element (not shown) in the wing mirror unit 20.

The observation unit 27 comprises an antenna module, which, during operation as transmitter, generates an electromagnetic actuation signal, in particular a radar signal, which is substantially directed to the blind spot 4. Radar is understood to mean the part of the electromagnetic spectrum in which infrared radiation, visible light, ultraviolet and X radiation are excluded. In radar, electromagnetic waves therefore have a frequency less than approximately 300 GHz. By using relatively high frequencies, transmitters and receivers remain relatively compact, while the accuracy remains relatively high. Preferably, a radar transmitter is used which is suitable for frequencies of approximately 20 GHz, for instance in the range of 17-22 GHz. Through the presence of an object in the blind spot 4, a reflected radar signal is generated. With the aid of multiplex techniques, the antenna module 27 also serves as receiver, so that reflected radar signals are observed and converted into electric signals, the observation data. Because the transmitter and the receiver are designed as an integrated antenna module 27, a compact and relatively inexpensive observation unit is obtained. By designing the antenna module 27 to be stationary, an observation unit is obtained that is relatively robust and wear-resistant, because no moving parts are included therein. The data processing unit 29 interprets the observation data, for instance by comparing the data with the aid of image processing techniques with preceding data to find out whether the detected object moves with respect to the motor vehicle 1. Furthermore, the data processing unit 29 may be arranged to determine the distance from the motor vehicle 1 to the detected object, for instance by measuring the time expiring between the transmission and reception of a signal. Besides, the relative velocity of the detected object with respect to the motor vehicle 1 can be measured, for instance by making use of the Doppler effect.

When, on the basis of the observation data, the data processing unit 29 registers an object in the blind spot 4 of the motor vehicle 1 that presents a potential danger for traffic safety, the data processing unit 29 transmits a signal to an indication unit, such as, for instance, an optical indicator 32, which is also disposed in the wing mirror unit 20, and which, on reception of the signal of the data processing unit 29, generates a warning signal, so that the driver 2, when using the left or right mirror 9, 10, is warned by the detection system. Preferably, the optical indicator 32 is designed as an LED, so that an inexpensive, reliable and compact indication unit is obtained. In a preferred embodiment, the optical indicator 32 is disposed between the mirror glass 31 and the mirror supporting plate 30, while the mirror glass is designed as a semi-permeable optical material, so that the warning signal of the optical indicator 32 passes through the mirror glass 31 out of the wing mirror unit, without effective reduction of the mirror surface of the mirror glass 31. Moreover, by disposing the indicator 32 below the mirror glass, the risk of damage and soiling of the indicator 32 diminishes.

Figure 4:
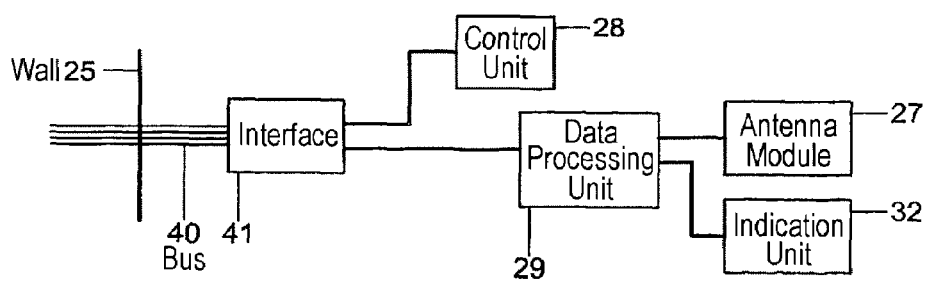
FIG. 4 shows an electric scheme of a wing mirror unit according to the invention.

The antenna module 27 and the indication unit 32 are electrically connected with the data processing unit 29, as, for instance, shown in FIG. 4. In the embodiment shown in FIG. 4, the data processing unit 29 is connected, via an interface 41 serving as slave unit, to a master-slave bus system 40, which extends through the outer wall 25 of the body of the motor vehicle 1. To this master-slave bus system 40 are also connectible other sensors and actuators of the motor vehicle, such as, for instance, velocity sensors or windscreen wiper systems. Via this master-slave bus system 40, the data processing unit 29 can obtain information from the motor vehicle, for instance to activate or deactivate the detection system, or to bring the detection system into an increased state of preparedness after direction indicators have been activated or the motor vehicle changes direction. Also the control unit 28 for controlling a heating element is, in this embodiment, connected to the interface 41, so that a heating element in the wing mirror unit 20 can be centrally controlled. Furthermore, also other electronic components in the wing mirror unit 20 may be connected to the interface 41, such as, for instance, the control of the motorized drive for adjusting the mirror supporting plate 30. Preferably, the data processing unit 29 is implemented on the actuator 26, so that the electric connection between the data processing unit 29 and the interface 41 can be of simple design, since the motorized drive is also already disposed on the actuator 26. By also disposing on the actuator 26 the antenna module 27 and other electronic components, the different electric and electronic elements, such as feed and signaling, can be easily and compactly realized during assembly, if required with the aid of preprinted wiring on the actuator 26. With a view to cost price saving, the data processing unit 29 may be integrated with the interface 41.

The radar bundle generated by the antenna module 27 is directed to the blind spot 4, while, for instance, an opening angle of 22° is applied. Because the antenna module 27 is included in the wing mirror unit 20 arranged on the exterior of the motor vehicle, a good position of the motor vehicle for the transmission and reception of radar signals has been obtained, while relatively few disturbing reflections occur through metal structures present in the motor vehicle 1. Since the mirror housing 21 is generally in plastic, a material transparent to radar, this advantageously forms an obstacle to the radar waves. Moreover, by including the antenna module 27 in the wing mirror unit 20, the necessity of providing extra openings in the body of the motor vehicle is avoided, so that cost is saved and flexibility with respect to an already designed motor vehicle is maintained.

In a preferred embodiment according to the invention, the observation unit transmits two radar bundles, which bundles spatially overlap each other partly, so that with the aid of a relatively inaccurate antenna module 27 a relatively accurate detection range can yet be defined.

The invention is not limited to the exemplary embodiments described herein. Many variants are possible.

Thus, it is not necessary to provide the observation unit with a transmitter and a receiver that are arranged to respectively transmit and receive radar signals. In an embodiment, the observation unit comprises an active or passive infrared system. In another embodiment, the observation unit comprises an optical camera, so that the data processing unit processes visual information.

In yet another embodiment, the detection system comprises a second observation unit for detecting an object in the second blind spot 6 in the area 5 diagonally before the driver 2.

Such variants will be clear to those skilled in the art and are deemed to lie within the scope of the invention as defined in the appended claims.

The invention claimed is:

1. A detection system for detecting an object in a blind spot of a wing mirror unit comprising:
    an observation unit for generating observation data;
    a data processing unit for processing the observation data;
    an indication unit for displaying a warning signal;
    a mirror supporting plate including a mirror glass; and
    an actuator disposed on a supporting frame, the actuator configured to adjust the mirror supporting plate;
    wherein the observation unit is disposed on the actuator and internal data communication connections of the system are disposed in said wing mirror unit such that the detection system is autonomous.

2. The detection system according to claim 1, including a slave unit connectible to a master-slave bus system.

3. The detection system according to claim 2, wherein the observation unit comprises an optical camera.

4. The detection system according to claim 2, wherein the observation unit comprises a transmitter for generating an electromagnetic actuation signal and a receiver for receiving an electromagnetic reflection signal.

5. The detection system according to claim 4, wherein the transmitter and the receiver are arranged to respectively generate and receive radar signals.

6. The detection system according to claim 4, wherein the transmitter and the receiver are integrated.

7. The detection system according to claim 1, wherein the data processing unit is mounted on the actuator.

8. The detection system according to claim 1, comprising a mirror housing mounted on the supporting frame; wherein the observation unit is disposed within the mirror housing.

9. The detection system according to claim 8, wherein the mirror housing substantially forms an exterior of said wing mirror unit.

10. The detection system according to claim 1, wherein the observation unit generates two electromagnetic actuation signals that spatially, at least partly, overlap each other.

11. The detection system according to claim 1, further comprising a second observation unit for generating observation data in connection with a second blind spot.

12. The detection system according to claim 11, wherein the observation data in connection with the second blind spot is generated or presented diagonally.

13. The detection system according to claim 1, wherein the indication unit comprises an optical indicator.

14. The detection system according to claim 13, wherein the optical indicator generates an optical signal and is disposed on a mirror supporting plate.

15. The detection system according to claim 1, wherein the mirror glass comprises a semi-permeable optical material and a signal generated by the optical indicator passes through the semi-permeable optical material out of said wing mirror unit.

16. An actuator unit comprising:
    a supporting frame;
    an actuator for adjusting a mirror supporting plate with respect to the supporting frame, the mirror supporting plate including a mirror glass, the actuator disposed on the supporting frame;
    a data processing unit connected to or disposed on the actuator; and
    an observation unit for detecting an object in a blind spot of a mirror unit, the observation unit disposed on the actuator;
    wherein the data processing unit processes observation data generated by the observation unit.

17. A mirror system comprising:
    a wing mirror; and
    a detection system for detecting an object in a blind spot of the wing mirror, the detection system including:
       an observation unit for generating observation data;
       a data processing unit for processing the observation data;
       an indication unit for displaying a warning signal; and
       an actuator disposed on a supporting frame,
       wherein the observation unit is disposed on the actuator:
          the actuator adjusts a mirror supporting plate; and
          internal data communication connections of the detection system are disposed in the wing mirror.

18. The mirror system according to claim 17, including mirror glass connected to the mirror supporting plate.

19. The mirror system according to claim 18, wherein the observation unit comprises an optical camera.

20. The mirror system according to claim 19, wherein the observation unit includes a transmitter and a receiver.

21. The mirror system according to claim 20, wherein the transmitter and the receiver generate and receive radar signals, respectively.

22. The mirror unit according to claim 21, wherein the transmitter and the receiver form an integrated module.

23. The mirror unit according to claim 20, wherein the mirror glass comprises a semi-permeable optical material, so that the optical signal generated by the optical indicator passes through the semi-permeable optical material.

24. The mirror unit according to claim 17, wherein the observation unit generates one or more electromagnetic actuation signals which at least partially overlap one another.

25. The mirror unit according to claim 17, further comprising a second observation unit for generating observation data in connection with a second blind spot.

26. The mirror unit according to claim 17, further including an indication unit having an optical indicator for generating an optical signal.

\* \* \* \* \*